(12) United States Patent
Glade et al.

(10) Patent No.: US 8,327,189 B1
(45) Date of Patent: Dec. 4, 2012

(54) DIAGNOSING AN INCIDENT ON A COMPUTER SYSTEM USING A DIAGNOSTICS ANALYZER DATABASE

(75) Inventors: Bradford B. Glade, Harvard, MA (US); Naum Gurevich, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 192 days.

(21) Appl. No.: 12/644,921

(22) Filed: Dec. 22, 2009

(51) Int. Cl.
G06F 11/00 (2006.01)

(52) U.S. Cl. ........... 714/26; 714/37; 714/38.11; 714/39; 714/45

(58) Field of Classification Search .................... 714/26, 714/37, 38.11, 39, 45
See application file for complete search history.

(56) References Cited

U.S. PATENT DOCUMENTS

| | | | |
|---|---|---|---|
| 5,740,357 A | 4/1998 | Gardiner et al. | |
| 5,901,156 A | 5/1999 | Botzenhardt et al. | |
| 6,253,151 B1 | 6/2001 | Ohler et al. | |
| 6,973,517 B1 | 12/2005 | Golden et al. | |
| 7,158,965 B1 | 1/2007 | Greenberg et al. | |
| 7,251,584 B1 * | 7/2007 | Perazolo et al. ............... 702/183 | |
| 7,712,083 B2 | 5/2010 | Coppert | |
| 7,844,861 B2 | 11/2010 | Hegarty et al. | |
| 7,962,791 B2 | 6/2011 | Compton et al. | |
| 7,983,900 B2 | 7/2011 | Moyle | |
| 8,010,845 B2 | 8/2011 | Rui et al. | |
| 8,073,114 B2 | 12/2011 | Mostafa | |
| 8,122,436 B2 | 2/2012 | Costa et al. | |
| 8,165,594 B2 | 4/2012 | Wang et al. | |
| 2005/0055673 A1 * | 3/2005 | Dias et al. ...................... 717/127 |
| 2005/0198527 A1 * | 9/2005 | Johnson et al. ................ 713/200 |
| 2005/0267702 A1 * | 12/2005 | Shah et al. ........................ 702/81 |
| 2007/0101344 A1 * | 5/2007 | Srivastava ...................... 719/321 |
| 2007/0169192 A1 * | 7/2007 | Main et al. ....................... 726/22 |
| 2007/0265713 A1 * | 11/2007 | Veillette et al. ................. 700/30 |
| 2008/0091384 A1 * | 4/2008 | Subramanian et al. ........ 702/185 |
| 2008/0133971 A1 * | 6/2008 | Zhou ................................ 714/32 |
| 2008/0155346 A1 * | 6/2008 | Britt et al. ........................ 714/43 |
| 2008/0215922 A1 * | 9/2008 | Cheng et al. .................... 714/39 |
| 2009/0106363 A1 * | 4/2009 | Fallen et al. ................... 709/204 |
| 2009/0193298 A1 * | 7/2009 | Mukherjee ...................... 714/38 |
| 2009/0292954 A1 * | 11/2009 | Jiang et al. ...................... 714/47 |
| 2009/0319313 A1 * | 12/2009 | Subash et al. ...................... 705/7 |
| 2010/0088054 A1 * | 4/2010 | Miguelanez et al. ........... 702/81 |
| 2010/0138694 A1 * | 6/2010 | Harrison et al. ................ 714/26 |
| 2010/0262332 A1 * | 10/2010 | Gilbert ............................ 701/32 |
| 2010/0324869 A1 * | 12/2010 | Cherkasova et al. ............. 703/2 |

* cited by examiner

*Primary Examiner* — Loan L. T. Truong
(74) *Attorney, Agent, or Firm* — BainwoodHuang (57) ABSTRACT

A technique diagnoses an incident on a computer system. The technique involves electronically receiving a bundle of diagnostic information from the computer system and storing the diagnostic information in memory after the incident on the computer system has occurred. The technique further involves electronically applying a set of diagnostics analyzers (e.g., diagnostics analyzers for discovering known incident signatures and invariant violations) from a diagnostics analyzer database to the diagnostic information after the bundle of diagnostic information is electronically received from the computer system and stored in the memory. The electronic application of the set of diagnostics analyzers from the diagnostics analyzers database to the diagnostic information results in a set of analyzer results. The technique further involves electronically generating a report which identifies a reason for the incident on the computer system based on the set of analyzer results.

22 Claims, 5 Drawing Sheets

FIG. 5

DIAGNOSING AN INCIDENT ON A COMPUTER SYSTEM USING A DIAGNOSTICS ANALYZER DATABASE

BACKGROUND

Once a computer is deployed at a customer site, conventional reporting and resolution of software failures (i.e., "software defects") largely can be a manual process. Typically, an end user who encounters a software failure reports the software failure to a system administrator. The system administrator then manually documents and conveys certain information regarding the software failure to a software technical support team and works with that team to accurately identify a cause of the failure as well as an effective cure.

Large software companies with mature and substantially stable software products may simply post common defects and appropriate procedures to fix or "work around" the defects on their websites. Such posting of common procedures on company websites enables customers to identify and remedy certain software problems themselves.

Additionally, some software companies incorporate simple defect reporting software routines into their software. Along these lines, when the software encounters a minor failure, the software prompts the user for permission to notify the software provider of the failure. If the user provides permission, the defect reporting software routine collects a small amount of operating system data and/or process image data and sends this data to the software provider. A defect reporting software routine which is similar to that described above is provided with certain versions of the Windows® operating system offered by Microsoft Corporation of Redmond, Wash.

SUMMARY

Unfortunately, there are deficiencies to the above-described conventional approaches to handling defect reporting and fixes. For example, manual defect reporting imposes a significant burden on the customer to document the software failure and pass the information on to a software technical support team. Additionally, such customer-driven defect reporting may be slow, and the customer-produced failure information for the same defects may vary from customer to customer.

Similarly, when large software companies post remedies for correcting the negative effects of defects on their websites, the burden of identifying the defects still rests with the customers. In particular, the customers must search their websites and hopefully find descriptions of the defects and the appropriate remedies on their own.

These conventional defect identification schemes may be acceptable for more mature software products with relatively few defects because, at this point, the software already may have been heavily tested, and the number and severity of any new defects may be relatively low. However, these conventional schemes may be difficult or even impractical to implement for relatively new software products. For example, a smaller software company (or even a new development group within a larger software company) may not have the resources to manually process all of the defect reports associated with new software products. Moreover, if a product is innovative and struggling to gain popularity, it may not be wise for any software company to impose the burden of detecting defects on its customer base.

Furthermore, in connection with the above-described conventional defect reporting software routines, the amount of information provided by the routines is relatively small (i.e., a small amount of operating system data and/or process image data). As such, the utility of these conventional defect reporting routines is limited. Along these lines, the primary purpose of these conventional defect reporting software routines may be simply to inform the software companies as to how widespread the defect encounters are, rather than help customers identify and resolve their software failures.

In contrast to the above-identified conventional approaches to handling software failures, improved techniques substantially automate the process of diagnosing incidents occurring on computer systems by receiving a bundle of diagnostic information from the computer systems, and applying diagnostics analyzers from a diagnostics analyzer database of diagnostics analyzers. Such improved techniques provide consistency and improve the speed at which incident causes and remedies are identified and provided. Moreover, these improved techniques enable a broad range of diagnostic data to be taken into account (e.g., from the database) that may be impractical to handle/process manually.

One embodiment is directed to a method of diagnosing an incident on a computer system. The method includes electronically receiving a bundle of diagnostic information from the computer system and storing the diagnostic information in memory after the incident on the computer system has occurred. The method further includes electronically applying a set of diagnostics analyzers (e.g., scripts for discovering known incident signatures and invariant violations) from a diagnostics analyzer database to the diagnostic information after the bundle of diagnostic information is electronically received from the computer system and stored in the memory. The electronic application of the set of diagnostics analyzers from the diagnostics analyzer database to the diagnostic information results in a set of diagnostics analyzer results. The method further includes electronically generating a report which identifies a reason for the incident on the computer system based on the set of diagnostics analyzer results.

Another embodiment is directed to an analyzer to diagnose an incident on a computer system. The analyzer includes memory, a diagnostics analyzer database, and processing circuitry coupled to the memory and the diagnostics analyzer database. The processing circuitry is constructed and arranged to electronically receive a bundle of diagnostic information from the computer system and store the diagnostic information in the memory after the incident on the computer system has occurred. The processing circuitry is further constructed and arranged to electronically apply a set of diagnostics analyzer from the diagnostics analyzer database to the diagnostic information after the bundle of diagnostic information is electronically received from the computer system and stored in the memory. The electronic application of the set of diagnostics analyzers from the diagnostics analyzer database to the diagnostic information provides a set of diagnostics analyzer results. The processing circuitry is constructed and arranged to electronically generate a report which identifies a reason for the incident on the computer system based on the set of diagnostics analyzer results.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique substantially automates the process of diagnosing an incident occurring on a computer system by obtaining a bundle of diagnostic information from the computer system, and employing diagnostics analyzers from a diagnostics analyzer database of diagnostic analysis scripts. Along these lines, the application of such scripts enables (i) automated comparison between particular data within the bundle of diagnostic information and known incident signatures as well as (ii) scrutiny of possible invariant violations. As a result, the improved technique provides consistency and improves the speed at which a cause of the incident and a remedy is identified and provided. Moreover, the improved technique is able to take into account a broad range of diagnostic data (e.g., log files, trace files, core dumps, state snapshots, etc.) that may be impractical for a software technical support team to effectively process manually.

Figure 1:
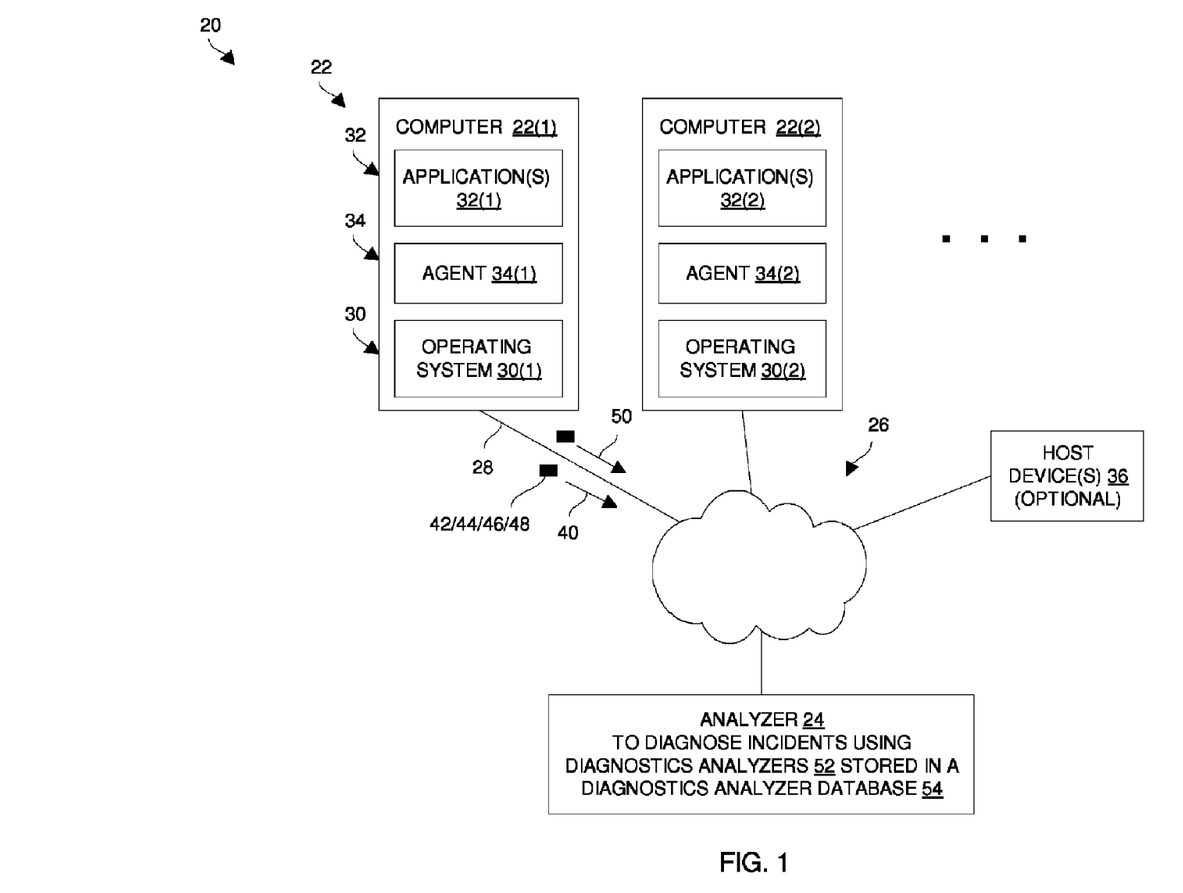
FIG. 1 is a block diagram of an electronic system within which an incident on a computer system is diagnosed using a diagnostics analyzer database.

FIG. 1 shows an electronic system 20 which is constructed and arranged to diagnose an incident (e.g., identify a cause of an electronic failure on a computer system) using a diagnostics analyzer database of diagnostics analyzers. The electronic system 20 includes computer systems 22(1), 22(2), . . . (collectively, computers 22), an analyzer 24 and a communications medium 26 which enables the computers 22 and the analyzer 24 to communicate with each other. The communications medium 26 is purposefully illustrated as a network cloud since the electronic system 20 is capable of having a variety of topologies such as hub-and-spoke, ring, backbone, irregular, combinations thereof, etc. Furthermore, it should be understood that the communications medium 26 may include a variety of individual network components (e.g., cables, switches, routers, gateways, wireless devices, etc.) and that each computer 22 may have more than one connection port 28 to the communications medium 26 for load balancing and fault tolerance purposes.

Each computer 22 includes a set of processors and memory to run an operating system 30, a set of applications 32, and an agent 34. For example, the computer 22(1) runs an operating system 30(1), a set of applications 32(1), and an agent 34(1). Similarly, the computer 22(2) runs an operating system 30(2), a set of applications 32(2), and an agent 34(2), and so on.

During operation, the sets of applications 32 on the computers 22 perform useful and productive work. For example, in the context of a distributed data storage system, the computers 22 preferably run data storage applications 32 and operating systems 30 which are optimized and coordinated so that the computers 22 operate as data storage nodes of a data storage cluster. In this context, the computers 22 perform data storage operations (e.g., load and store operations, caching operations, other distributed storage appliance operations, etc.) on behalf of a set of external host devices 36.

On occasion, a hardware, software or firmware malfunction or other event that prevents the system from performing required operations may occur on a computer 22. When such an incident occurs, the computer 22 prepares a comprehensive bundle 40 of diagnostic information, and sends that bundle 40 to the analyzer 24 for analysis and resolution. In particular, the agent 34 running on that computer 22 (e.g., the agent 34(1) running on the computer 22(1), see FIG. 1) electronically collects trace files 42 produced by the applications 32, process images 44 which define memory contents of processes running the applications 32, and state snapshots 46 identifying current operating states of the computer 22 as well as other information 48 (e.g., software versions, hardware versions, configuration information, etc.), and transmits this data 42,44,46,48 to the analyzer 24 through the communications medium 26.

In some arrangements, the agent 34 on the computer 22 which encountered the anomaly sends notification messages 50 to the agents 34 on the other computers 22 (e.g., the agent 34 running on other computer nodes of a cluster). These notification messages 50 direct the agents 34 running on the other computers 22 to prepare and send similar bundles 40 of their diagnostic information 42,44,46,48 from those computer 22 to the analyzer 24.

Additionally, it should be understood that in some arrangements, the agents 34 are tightly integrated with the operating systems 30 and/or the applications 32 (e.g., the agents 34 may be embedded as incident reporting routines within the operating systems 30 and/or the applications 32 themselves). In these arrangements, the agents 34 are constructed and arranged to deeply gather operating data which is well beyond conventional defect reporting software routines which only report a small amount of operating system data and/or process image data (e.g., the agents 34 collect and send core dumps, trace files, log files, etc.).

Upon receipt of a bundle 40 of diagnostic information 42,44,46,48 from a computer 22 on which an incident has occurred, the analyzer 24 unbundles the various pieces of diagnostic information 42,44,46,48, and stores the diagnostic information 42,44,46,48 in separate locations in memory for analysis. The analyzer 24 then applies diagnostics analyzers 52 from the diagnostics analyzer database 54 to the diagnostic information 42,44,46,48 to diagnose the incident and possibly provide a remedy. Further details will now be provided with reference to FIG. 2.

Figure 2:
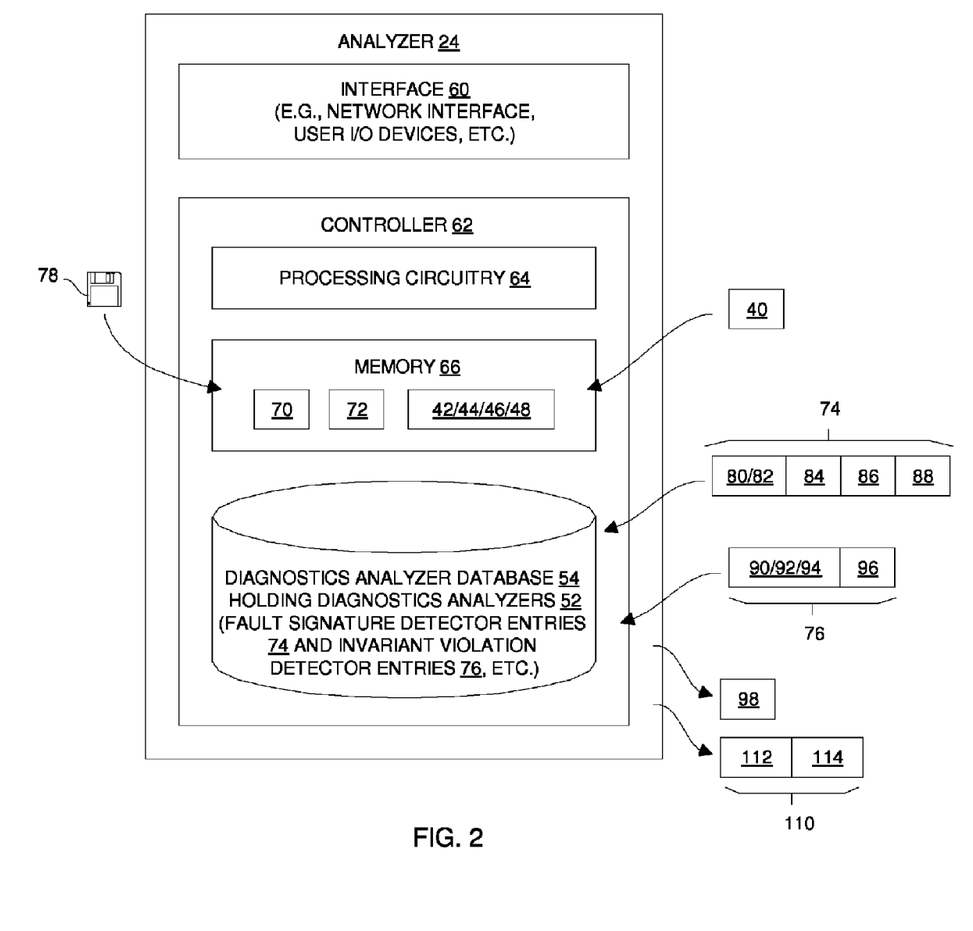
FIG. 2 is a block diagram of an analyzer of the electronic system of FIG. 1.

FIG. 2 shows certain details of the analyzer 24 of FIG. 1. The analyzer 24 includes an interface 60 and a controller 62. The interface 60 preferably includes a variety of components for accessing the analyzer 24 such as a network adapter to provide access to the communications medium 26 (FIG. 1), a user interface to receive commands and provide output to a user, and so on. The controller 62 includes processing circuitry 64 (e.g., one or more processors), memory 66, and the diagnostics analyzer database 54 (also see FIG. 1). The memory 66 may be formed by volatile memory (e.g., relatively fast semiconductor memory), non-volatile memory (e.g., hard disk drives), or a combination of both. The memory 66 is constructed and arranged to store a diagnostic application 70, diagnostic information 42,44,46,48 obtained from various computers 22, and additional software constructs 72 (e.g., an operating system, tools for diagnosing new incidents, etc.). The diagnostics analyzer database 54 includes fault signature detector entries 74 and invariant violation detector entries 76 which define the diagnostics analyzers 52.

The diagnostic application 70 is responsible for, among other things, applying the diagnostics analyzers 52 defined by the fault signature detector entries 74 and the invariant violation detector entries 76 to the diagnostic information 42,44, 46,48 to diagnose the incident and possibly provide a remedy. The diagnostic application 70 is capable of being delivered to and installed on the analyzer 24 from a computer program product 78 (illustrated generally by a diskette icon 78). Such a computer program product 78 includes a computer readable medium which stores instructions that are executed by the processing circuitry 64 (e.g., a microprocessor, a set of processors, etc.). Examples of suitable computer readable media include CD-ROM, flash memory, disk memory, tape memory, and the like.

Similarly, the diagnostics analyzers 52 can be loaded into the diagnostics analyzer database 54 via the computer program product 78. Alternatively, the diagnostics analyzers 52 can be added incrementally over time as additional incidents are encountered (e.g., as new defects are discovered and new remedies are developed). Along these lines, a user is able to (i) update the diagnostics analyzer database 54 with new fault signature detector entries 74 as new faults are discovered and new remedies are developed, as well as (ii) delete outdated fault signature detector entries 74 from the diagnostics analyzer database 54 as old faults and old remedies of the outdated fault signature entries 74 become obsolete over time. Similarly, new invariant violation detector entries 76 can be added, and obsolete invariant violation detector entries 76 can be removed from the database 54 over time.

As shown in FIG. 2, each fault signature detector entry 74 includes, as one of the diagnostics analyzers 52, a fault signature detector 80 containing a fault signature 82, a known fault description 84, a recommendation 86 to remedy that known fault, and additional information 88. The fault signature 82 includes details of a particular known fault such as a particular address location which is a characteristic of that fault, a particular parameter value which is a characteristic of that fault, version numbers of products containing the fault, etc. The known fault description 84 distinctly identifies the known fault among other known faults (e.g., contains a unique identifier, a title and description of the known fault, etc.). The recommendation 86 to remedy the known fault is a description of what is needed to resolve the known fault (e.g., one or more predefined procedures for fixing the known fault, temporary patches and fixes, versions or upgrades to permanently resolve the known fault, configuration changes to cure or lessen the severity of the known fault, additional repair/correction information, etc.). The additional information 88 includes related details such as dates of fault discovery and resolution, names of engineers with expertise regarding the known fault, a thorough listing of software releases containing fixes, and so on.

As further shown in FIG. 2, each invariant violation detector entry 76 includes, as one of the diagnostics analyzers 52, an invariant violation detector 90 containing a situation description 92 and invariant conditions 94. The situation description 92 identifies a particular situation among a variety of different situations (e.g., standalone computer configurations, cluster configurations, etc.), and the invariant conditions 94 define particular criteria that must be satisfied for that particular situation. These invariant conditions 94 are deemed to be necessary for proper operation and, if the invariant conditions 94 are not met or not in place, a violation is considered to exist. Such invariant conditions 94 may include specific expected invariant sequence expressions, i.e., certain trace sequences from the computers 22 must match these expected invariant sequence expressions from the database 54 or a violation is deemed to exist. Further details will now be provided with reference to both FIGS. 2 and 3.

Figure 3:
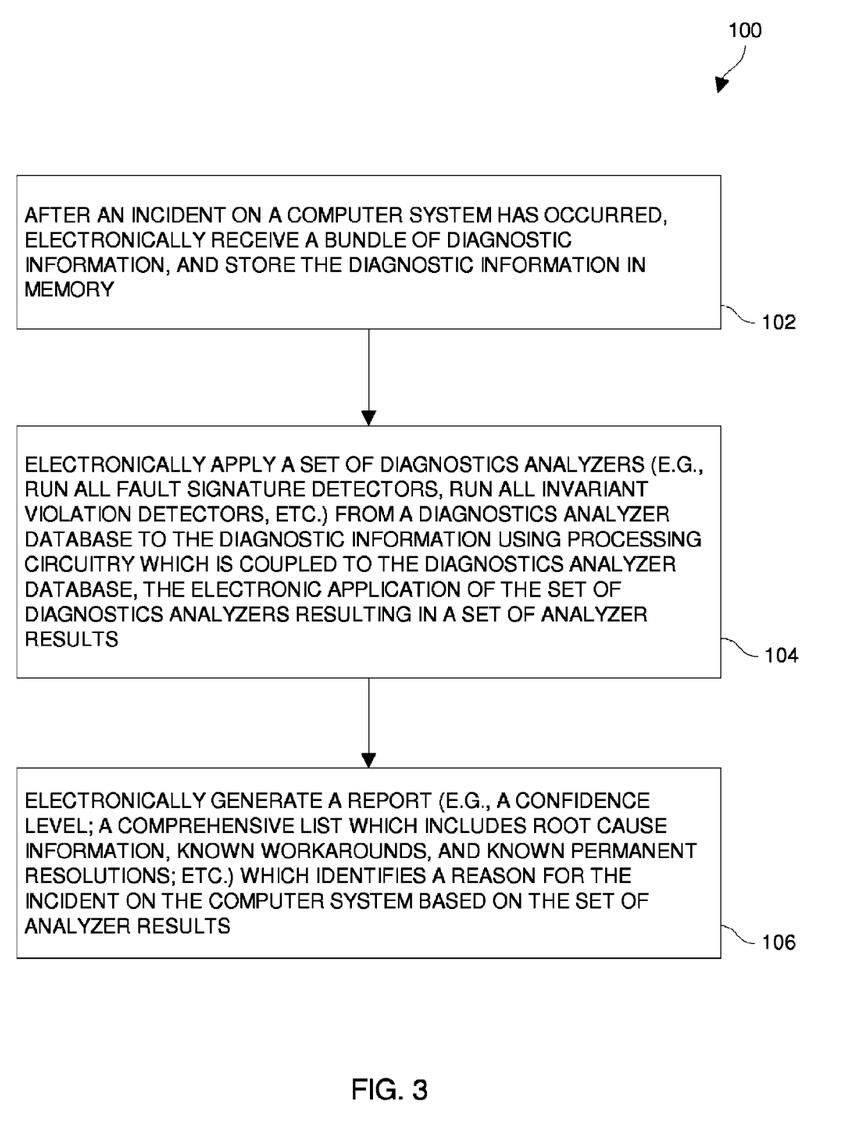
FIG. 3 is a flowchart of a procedure which is performed by the analyzer of FIG. 2.

FIG. 3 shows a procedure 100 which is performed by the processing circuitry 64 of the analyzer 24 when diagnosing an incident from a computer system 22. In step 102, after the incident on the computer system 22 has occurred, the processing circuitry 64 electronically receives a bundle 40 of diagnostic information 42/44/46/48 from an agent 34 running on the computer system 22 (also see FIG. 1). The processing circuitry 64 unbundles the diagnostic information 42/44/46/48, and stores the diagnostic information 42/44/46/48 in particular locations within the memory 66 (also see FIG. 2).

In step 104, the processing circuitry 64 electronically applies the diagnostics analyzers 52 from the diagnostics analyzer database 54 to the diagnostic information 42/44/46/48. That is, the processing circuitry 64 methodically applies the diagnostics analyzers 52 to the diagnostic information 42/44/46/48 in the memory 66. The electronic application of the diagnostics analyzers 52 results in a set of diagnostics analyzer results 98 (FIG. 2).

In particular, for each fault signature detector 80 in the diagnostics analyzer database 54, the processing circuitry 64 searches or scans particular portions of the diagnostic information 42/44/46/48 for the fault signature 82 of that fault signature detector 80. If a match is discovered, the processing circuitry 64 outputs a positive result (i.e., a first fault indication signal value) indicating discovery of the known fault and providing, among other things, the recommendation 86 to remedy the known fault. If no match is discovered for any fault detector, the processing circuitry 64 outputs a negative result (i.e., a second fault indication signal value) which indicates that no fault signatures 82 were discovered in the diagnostic information 42/44/46/48.

Similarly, for each invariant violation detector 90 in the diagnostics analyzer database 54, the processing circuitry 64 compares the situation description 92 to the diagnostic information 42/44/46/48 to determine whether the known invariant conditions 94 should be applied. If so, the processing circuitry 64 checks the diagnostic information 42/44/46/48 to see whether the known invariant conditions 94 are satisfied. If the known invariant conditions 94 are not satisfied, the processing circuitry 64 outputs a first result (i.e., a first invariant indication signal value) indicating that a violation exists. However, if all known invariant conditions 94 are satisfied, the processing circuitry 64 outputs a different result (i.e., a second invariant indication signal value) indicating that no invariant violations exist.

In step 106 of the procedure 100, the processing circuitry 64 electronically generates a report 110 which identifies a reason for the incident on the computer 22 based on the analyzer results 98. In particular, after the processing circuit 64 has applied all of the fault signature detectors 82 from the fault signature detector entries 74 and all of the invariant violation detectors 90 from the invariant violation detector entries 76 in the diagnostics analyzers database 54, the processing circuitry 64 weighs the analyzer results 98 and outputs the report 110 based on the weighted analyzer results 98. The report 110 includes, among other things, a description of the incident, repair/correction information, identification of product releases containing the fixes/remedies, etc. In situations in which multiple analyzer results 98 corroborate the existence of a particular known fault, the report 110 includes a confidence level 112 indicating a high level of confidence for the reason for the incident among other possible reasons for the incident. Such a weighted analysis of the analyzer results provides an indication of how correct the analysis is in the event some of the analyzer results 98 are conflicting or indicate the existence of other issues.

In some arrangements, the report 110 is a comprehensive list 114 containing known root cause information (i.e., the reason for the incident), a known workaround which temporarily prevents reoccurrence of the incident, and known resolution information which permanently prevents reoccurrence of the incident. As a result, the incident can be quickly addressed with the known workaround, and later more-permanently addressed. Further details will now be provided with reference to FIG. 4.

Figure 4:
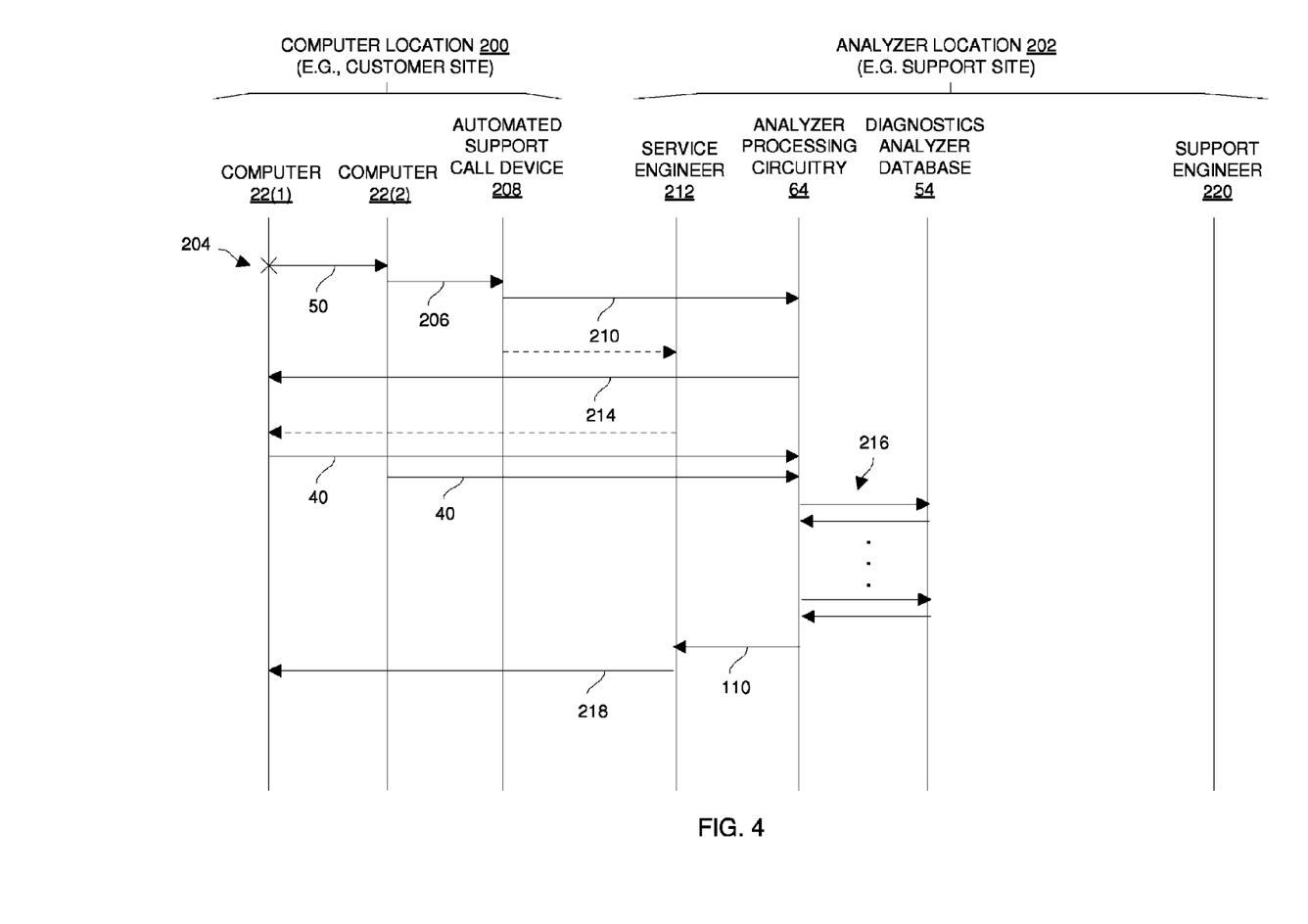
FIG. 4 is a sequence diagram illustrating events which occur within the electronic system of FIG. 1 to discover a known incident and provide a remedy.

FIG. 4 is a sequence diagram illustrating events which occur between a computer location 200 (e.g., a customer site) and an analyzer location 202 (e.g., a support site) to discover a known incident and provide a remedy. First, an incident 204 (e.g., some event that prevents the system from performing required operations) occurs on a computer 22(1) (also see FIG. 1) at the computer location 200 and, in response to the incident 204, the agent 34(1) (FIG. 1) produces and saves diagnostics information 42/44/46/48 from the computer 22(1). In some cluster situations such as in the context of a data storage cluster, the computer 22(1) that encountered the incident sends a message 50 to other computers 22 in the cluster (e.g., the computer 22(2)), also see FIG. 2) to similarly produce and save their diagnostics information 42/44/46/48. The computer 22(1) then sends a notification 206 to an automated support call device 208 at the customer location 200. The automated support call device 208 then provides an automated support call 210 to the analyzer processing circuitry 64 of the analyzer 24 (or alternatively to a service engineer 212 at the analyzer location 202 as shown by the dashed line in FIG. 4). In some situations, the automated support call device 208 may reside on one of the computers 22 (FIG. 1). In other situations, the automated support call device 208 is independent of the computers 22.

In response to the notification 206, the analyzer processing circuitry 64 (or alternatively the service engineer 212) sends a command 214 to the computer 22(1). The computer 22(1) responds to the command 212 by collecting the diagnostics information 42/44/46/48 and transmitting the diagnostics information 42/44/46/48 as a bundle 40 back to the analyzer 24. In the case of a cluster, this diagnostics information 42/44/46/48 may also be collected in the form of bundles 40 from other computers 22 in the cluster (e.g., the computer 22(2), also see FIG. 2). Such operation enables the diagnoses of failures resulting from malfunctioning or incorrectly configured clusters. The effective and speedy diagnoses provided by the analyzer 24 reduces the likelihood of encountering a second incident making the analyzer 24 well suited for diagnosing an incident on a high availability system which continues to perform operations even after the incident, e.g., some data storage clusters try to continue to perform data storage operations even after failure of a particular data storage node.

The analyzer processing circuitry 64, perhaps under direction of the service engineer 212, then applies the diagnostics analyzers 52 from the diagnostics analyzers database 54 in an attempt to identify a cause of the incident 204. The application of the individual diagnostics analyzers 52 is illustrated in FIG. 4 as the set of arrows 216. There is no requirement to the application order of the diagnostics analyzers 52, i.e., the processing circuitry 64 can apply the fault signature detectors 80 first or the invariant violation detectors 90 first.

The analyzer processing circuitry 64 then provides a report 110 to the service engineer 212. At this point, if the report 110 includes a found match, i.e., a successfully diagnosed known fault and a remedy, the service engineer 212 can take action 218 by implementing the remedy on the computer 22 or on multiple computers 22 at the computer location 200.

At this point, it should be understood that the diagnostic activity is carried out in a substantially automated manner. In particular, the application 216 of the diagnostics analyzers 52 enables automated comparison between particular diagnostic information and known incident signatures as well as scrutiny of possible invariant violations. Accordingly, the diagnostic activity provides consistency and improves the speed at which a cause of the incident and a remedy is identified and provided. Furthermore, the diagnostic activity is able to take into account a broad range of diagnostic data (e.g., log files, trace files, binary dumps, state snapshots, etc.) that may be impractical for a software technical support team to effectively process manually. Moreover, it should be understood that the support engineer 220, i.e., the technical expert tasked with developing new remedies to newly encountered incidents, does not need to be involved during this more-routine diagnostic activity.

Figure 5:
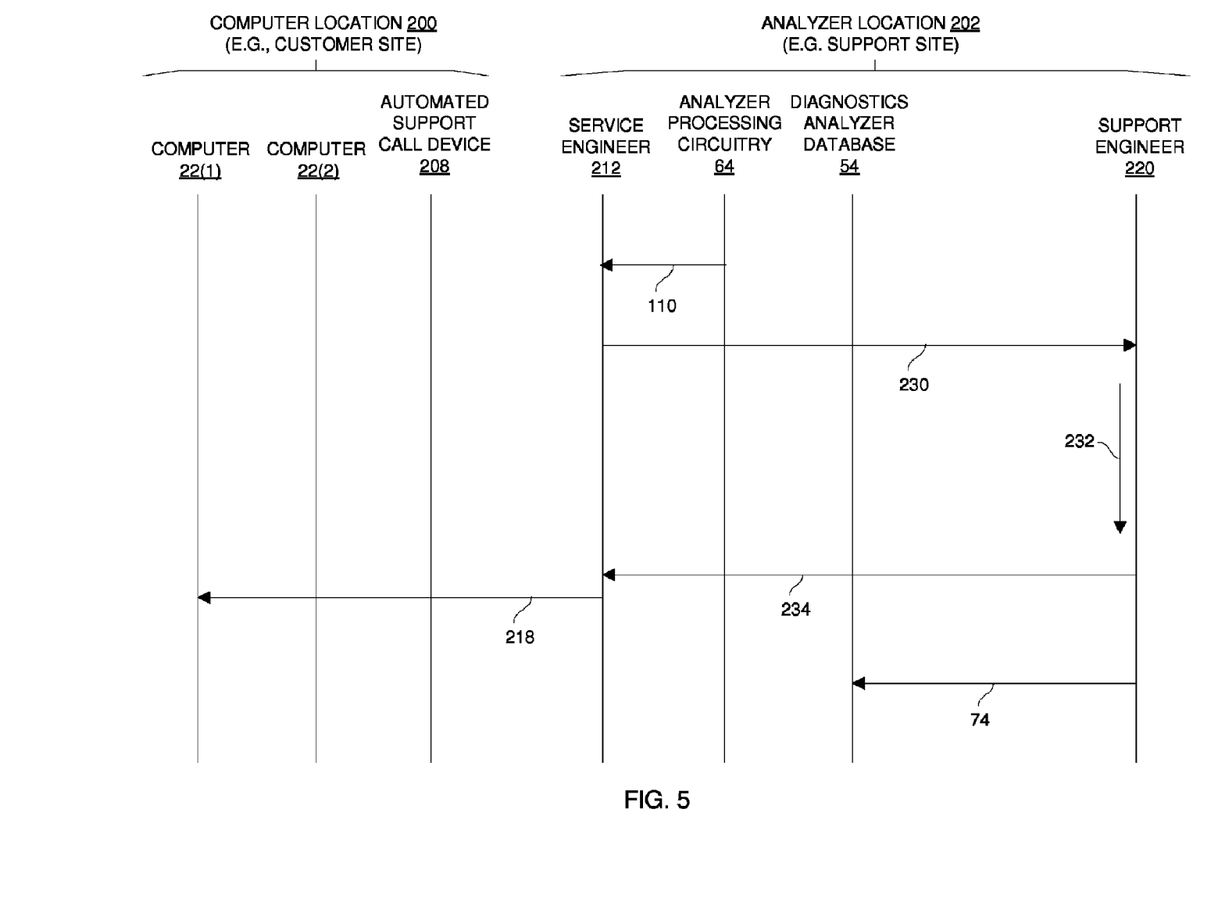
FIG. 5 is a sequence diagram illustrating events which occur within the electronic system of FIG. 1 when a known incident is not discovered and a new entry is made in the diagnostics analyzer database.

FIG. 5 is a sequence diagram illustrating further events which can occur when no match is found for an incident 204. In this situation, the report 110 generated by the processing circuitry 64 of the analyzer 24 informs the service engineer 212 that there was not a matching incident in the database 54. Next, the service engineer 212 sends a notification 230 of the non-matched incident 204 to the support engineer 220 to develop a remedy for that incident 204 and a new diagnostics analyzer 52 for the diagnostics analyzer database 54.

The support engineer 220 then studies the incident, develops a cure for the incident, and writes an automated analyzer which is appropriate for detecting the incident from the diagnostics information 42/44/46/48 which is typically provided by the agents 34. Such new rule development activity is illustrated by arrow 232 in FIG. 5.

The support engineer 220 may provide the cure 234 for the incident directly to the service engineer 212 who then takes action 218 to effectuate resolution of the incident 204 at the computer 22(1). The support engineer 220 then creates a new fault signature detector entry 74 for that incident 204 and stores the new fault signature detector entry 74 in the diagnostics analyzer database 54. Accordingly, the analyzer 24 is now equipped to diagnose and cure a similar incident 204 in the future.

In combination with the addition of a new fault signature detector entry 74 or as an alternative to adding a new fault signature detector entry 74, the support engineer 220 may add a new invariant violation detector entry 76 to the diagnostics analyzer database 54. The activity of adding new entries 74, 76 can occur at any time to improve the detection/diagnostic capabilities of the system 20.

It should be understood that the above-described electronic system 20 works effectively and efficiently in the context of mature software products with relatively few defects as well as with relatively new software products. In particular, the automated operation of the analyzer 24 offers comprehensive and consistent diagnoses of incidents and alleviates the need for a manually intensive defect reporting and fixing process. Along these lines, the analyzer 24 takes into account a broad range of diagnostic data as well as semantic analysis of system logs to detect violations of systemic invariants and identify potential errors in system execution. Overall, the amount of time to problem resolution for known defects and unknown defects is significantly reduced.

While various embodiments of the invention have been particularly shown and described, it will be understood by those skilled in the art that various changes in form and details may be made therein without departing from the spirit and scope of the invention as defined by the appended claims.

What is claimed is:

1. A method of diagnosing an incident on a computer system, the method comprising:

after the incident on the computer system has occurred, electronically receiving a bundle of diagnostic information from the computer system and storing the diagnostic information in a memory;

after electronically receiving the bundle of diagnostic information from the computer system and storing the diagnostic information in the memory, electronically applying a set of diagnostics analyzers from a diagnostics analyzer database to the diagnostic information using processing circuitry which is coupled to the diagnostics analyzer database, the electronic application of the set of diagnostics analyzers from the diagnostics analyzer database to the diagnostic information resulting in a set of analyzer results; and electronically generating a report which identifies a reason for the incident on the computer system based on the set of analyzer results;

wherein the diagnostics analyzer database stores fault signature detector entries, each fault signature detector entry including (i) a fault signature, (ii) a known fault associated with that fault signature, and (iii) a recommendation to remedy that known fault;

wherein electronically applying the set of diagnostics analyzers from the diagnostics analyzer database to the diagnostic information includes:

scanning the diagnostic information for the fault signature of each fault signature detector entry stored in the diagnostics analyzer database, and providing a fault indication signal identifying whether the fault signature of any fault signature detector entry was discovered in the diagnostic information during scanning of the diagnostic information for the fault signature of each fault signature detector entry;

wherein the diagnostics analyzer database further stores invariant violation detector entries, each invariant violation detector entry including a known invariant condition which is needed for proper operation of the computer system;

wherein electronically applying the set of diagnostics analyzers from the diagnostics analyzer database to the diagnostic information further includes:

scanning the diagnostic information for the known invariant condition of each invariant violation detector entry stored in the diagnostics analyzer database, and providing an invariant indication signal identifying whether the known invariant condition of any invariant violation detector entry was violated based on scanning the diagnostic information for the known invariant condition of each invariant violation detector entry; and wherein electronically applying the set of diagnostics analyzers from the diagnostics analyzer database to the diagnostic information is complete only after (i) the fault indication signal has been provided and (ii) the respective invariant indication signal has been provided, the fault indication signal and the invariant indication signal forming at least a portion of the set of analyzer results.

2. A method as in claim 1 wherein electronically generating the report which identifies the reason for the incident on the computer system based on the set of analyzer results includes:

providing a confidence level signal indicating a level of confidence for the reason for the incident among other possible reasons for the incident, the level of confidence being based on a weighted analysis of the set of analyzer results.

3. A method as in claim 1 wherein electronically generating the report which identifies the reason for the incident on the computer system based on the set of analyzer results includes:

outputting, as the report, a list containing (i) known root cause information as the reason for the incident, (ii) a known workaround which temporarily prevents reoccurrence of the incident, and (iii) known resolution information which permanently prevents reoccurrence of the incident.

4. A method as in claim 1 wherein electronically receiving and storing the diagnostic information includes:

obtaining, as the bundle of diagnostic information, an electronic transmission from the computer system, the electronic transmission containing (i) a set of trace files produced by a set of applications which was running on the computer system when the incident on the computer system occurred, (ii) a set of process images defining memory contents of a set of processes running the set of applications on the computer system, and (iii) a set of state snapshots identifying a set of current operating states of the computer system when the incident on the computer system occurred, and storing the set of trace files, the set of process images, and the set of state snapshots in separate locations within the memory for individual searching using the diagnostics analyzers.

5. A method as in claim 4 wherein the computer system includes multiple processing nodes connected together on a computer network; and wherein obtaining the electronic transmission from the computer system includes acquiring, from each processing node, (i) at least one trace file from that processing node, (ii) at least one process image from that processing node, and (iii) at least one state snapshot from that processing node.

6. A method as in claim 5 wherein the multiple processing nodes of the computer system are constructed and arranged to operate as a data storage cluster; and wherein the method further comprises:

implementing a remedy on the data storage cluster based on the reason identified on the electronically generated report to cure operation of the data storage cluster.

7. A method as in claim 6 wherein the data storage cluster resides at a field location, and the processing circuitry and the diagnostics analyzer database reside at an analyzer location which is separate from the field location; and wherein the method further comprises:

updating the diagnostics analyzer database residing at the analyzer location with new fault signature detector entries as new faults are discovered and new remedies are developed over time.

8. A method as in claim 7, further comprising:

deleting outdated fault signature detector entries from the diagnostics analyzer database residing at the analyzer location as old faults and old remedies of the outdated fault signature entries become obsolete over time.

9. An analyzer apparatus to diagnose an incident on a computer system, the analyzer comprising:
  memory;
  a diagnostics analyzer database; and
  processing circuitry coupled to the memory and the diagnostics analyzer database, the processing circuitry being constructed and arranged to:
    electronically receive a bundle of diagnostic information from the computer system and store the diagnostic information in the memory after the incident on the computer system has occurred,
    electronically apply a set of diagnostics analyzers from the diagnostics analyzer database to the diagnostic information after the bundle of diagnostic information is electronically received from the computer system and stored in the memory, the electronic application of the set of diagnostics analyzers from the diagnostics analyzer database to the diagnostic information resulting in a set of analyzer results, and
    electronically generate a report which identifies a reason for the incident on the computer system based on the set of analyzer results;
  wherein the diagnostics analyzer database stores fault signature detector entries, each fault signature detector entry including (i) a fault signature, (ii) a known fault associated with that fault signature, and (iii) a recommendation to remedy that known fault;
  wherein the processing circuitry, when electronically applying the set of diagnostics analyzers from the diagnostics analyzer database to the diagnostic information, is constructed and arranged to:
    scan the diagnostic information for the fault signature of each fault signature detector entry stored in the diagnostics analyzer database, and
    provide a fault indication signal identifying whether the fault signature of any fault signature detector entry was discovered in the diagnostic information during scanning of the diagnostic information for the fault signature;
  wherein the diagnostics analyzer database further stores invariant violation detector entries, each invariant violation detector entry including a known invariant condition which is needed for proper operation of the computer system;
  wherein the processing circuitry, when electronically applying the set of diagnostics analyzers from the diagnostics analyzer database to the diagnostic information, is further constructed and arranged to:
    scan the diagnostic information for the known invariant condition of each invariant violation detector entry stored in the diagnostics analyzer database, and
    provide an invariant indication signal identifying whether the known invariant condition of any invariant violation detector entry was satisfied based on scanning the diagnostic information for the known invariant condition; and
  wherein electronically applying the set of diagnostics analyzers from the diagnostics analyzer database to the diagnostic information is complete only after (i) the fault indication signal has been provided and (ii) the respective invariant indication signal has been provided, the fault indication signal and the invariant indication signal forming at least a portion of the set of analyzer results.

10. An analyzer apparatus as in claim 9 wherein the processing circuitry, when electronically generating the report which identifies the reason for the incident on the computer system based on the set of analyzer results, is constructed and arranged to:
  provide a confidence level signal indicating a level of confidence for the reason for the incident among other possible reasons for the incident, the level of confidence being based on a weighted analysis of the set of analyzer results.

11. An analyzer apparatus as in claim 9 wherein the processing circuitry, when electronically generating the report which identifies the reason for the incident on the computer system based on the set of analyzer results, is constructed and arranged to:
  output, as the report, a list containing (i) known root cause information as the reason for the incident, (ii) a known workaround which temporarily prevents reoccurrence of the incident, and (iii) known resolution information which permanently prevents reoccurrence of the incident.

12. An analyzer apparatus as in claim 9 wherein the processing circuitry, when electronically receiving and storing the bundle of diagnostic information, is constructed and arranged to:
  obtain, as the bundle of diagnostic information, an electronic transmission from the computer system, the electronic transmission containing (i) a set of trace files produced by a set of applications which was running on the computer system when the incident on the computer system occurred, (ii) a set of process images defining memory contents of a set of processes running the set of applications on the computer system, and (iii) a set of state snapshots identifying a set of current operating states of the computer system when the incident on the computer system occurred, and
  store the set of trace files, the set of process images, and the set of state snapshots in separate locations within the memory for individual searching using the diagnostics analyzers.

13. An analyzer apparatus as in claim 12 wherein the computer system includes multiple processing nodes connected together on a computer network; and
  wherein the processing circuitry, when obtaining the electronic transmission from the computer system, is constructed and arranged to acquire, from each processing node of the computer system, (i) at least one trace file from that processing node, (ii) at least one process image from that processing node, and (iii) at least one state snapshot from that processing node.

14. An analyzer apparatus as in claim 13, further comprising:
  a user interface coupled to the processing circuitry;
  the processing circuitry being constructed and arranged to respond to user commands, which are received through the user interface, by (i) updating the diagnostics analyzer database with new fault signature detector entries as new faults are discovered and new remedies are developed over time, and (ii) deleting outdated fault signature detector entries from the diagnostics analyzer database as old faults and old remedies of the outdated fault signature entries become obsolete over time.

15. A computer program product which includes a non-transitory computer readable medium storing a set of instructions to diagnose an incident on a computer system, the set of instructions causing computing circuitry to perform a method, comprising:
  after the incident on the computer system has occurred, electronically receiving a bundle of diagnostic information from the computer system and storing the diagnostic information in a memory;

after electronically receiving the bundle of diagnostic information from the computer system and storing the diagnostic information in the memory, electronically applying a set of diagnostics analyzers from a diagnostics analyzer database to the diagnostic information using processing circuitry which is coupled to the diagnostics analyzer database, the electronic application of the set of diagnostics analyzers from the diagnostics analyzer database to the diagnostic information resulting in a set of analyzer results; and electronically generating a report which identifies a reason for the incident on the computer system based on the set of analyzer results;

wherein the diagnostics analyzer database stores fault signature detector entries, each fault signature detector entry including (i) a fault signature, (ii) a known fault associated with that fault signature, and (iii) a recommendation to remedy that known fault;

wherein electronically applying the set of diagnostics analyzers from the diagnostics analyzer database to the diagnostic information includes:
  scanning the diagnostic information for the fault signature of each fault signature detector entry stored in the diagnostics analyzer database, and
  providing a fault indication signal identifying whether the fault signature of any fault signature detector entry was discovered in the diagnostic information during scanning of the diagnostic information for the fault signature of each fault signature detector entry;

wherein the diagnostics analyzer database further stores invariant violation detector entries, each invariant violation detector entry including a known invariant condition which is needed for proper operation of the computer system;

wherein electronically applying the set of diagnostics analyzers from the diagnostics analyzer database to the diagnostic information further includes:
  scanning the diagnostic information for the known invariant condition of each invariant violation detector entry stored in the diagnostics analyzer database, and
  providing an invariant indication signal identifying whether the known invariant condition of any invariant violation detector entry was violated based on scanning the diagnostic information for the known invariant condition of each invariant violation detector entry; and wherein electronically applying the set of diagnostics analyzers from the diagnostics analyzer database to the diagnostic information is complete only after (i) the fault indication signal has been provided and (ii) the respective invariant indication signal has been provided, the fault indication signal and the invariant indication signal forming at least a portion of the set of analyzer results.

16. A computer program product as in claim 15 wherein electronically generating the report which identifies the reason for the incident on the computer system based on the set of analyzer results includes:
  providing a confidence level signal indicating a level of confidence for the reason for the incident among other possible reasons for the incident, the level of confidence being based on a weighted analysis of the set of analyzer results.

17. A computer program product as in claim 15 wherein electronically generating the report which identifies the reason for the incident on the computer system based on the set of analyzer results includes:
  outputting, as the report, a list containing (i) known root cause information as the reason for the incident, (ii) a known workaround which temporarily prevents reoccurrence of the incident, and (iii) known resolution information which permanently prevents reoccurrence of the incident.

18. A computer program product as in claim 15 wherein electronically receiving and storing the diagnostic information includes:
  obtaining, as the bundle of diagnostic information, an electronic transmission from the computer system, the electronic transmission containing (i) a set of trace files produced by a set of applications which was running on the computer system when the incident on the computer system occurred, (ii) a set of process images defining memory contents of a set of processes running the set of applications on the computer system, and (iii) a set of state snapshots identifying a set of current operating states of the computer system when the incident on the computer system occurred, and
  storing the set of trace files, the set of process images, and the set of state snapshots in separate locations within the memory for individual searching using the diagnostics analyzers.

19. A computer program product as in claim 18 wherein the computer system includes multiple processing nodes connected together on a computer network; and
  wherein obtaining the electronic transmission from the computer system includes acquiring, from each processing node, (i) at least one trace file from that processing node, (ii) at least one process image from that processing node, and (iii) at least one state snapshot from that processing node.

20. A computer program product as in claim 19 wherein the multiple processing nodes of the computer system are constructed and arranged to operate as a data storage cluster; and
  wherein the method further comprises:
    implementing a remedy on the data storage cluster based on the reason identified on the electronically generated report to cure operation of the data storage cluster.

21. A computer program product as in claim 20 wherein the data storage cluster resides at a field location, and the processing circuitry and the diagnostics analyzer database reside at an analyzer location which is separate from the field location; and
  wherein the method further comprises:
    updating the diagnostics analyzer database residing at the analyzer location with new fault signature detector entries as new faults are discovered and new remedies are developed over time.

22. A computer program product as in claim 21, further comprising:
  deleting outdated fault signature detector entries from the diagnostics analyzer database residing at the analyzer location as old faults and old remedies of the outdated fault signature entries become obsolete over time.

* * * * *